United States Patent [19]
Goto

[11] 4,080,853
[45] Mar. 28, 1978

[54] NUMERICALLY CONTROLLED LATHE

[75] Inventor: Yoshiaki Goto, Kasugai, Japan

[73] Assignee: Okuma Machinery Works, Ltd., Nagoya, Japan

[21] Appl. No.: 719,191

[22] Filed: Aug. 31, 1976

[30] Foreign Application Priority Data

Mar. 10, 1976 Japan .................. 51-26267

[51] Int. Cl.² .................. B23B 3/18
[52] U.S. Cl. .................. 82/2 R; 82/2 B; 82/28 R; 29/27 C; 29/36; 408/35
[58] Field of Search .................. 82/2 R, 28 R, 2 B; 29/36, 39, 40, 43, 44, 27 C; 408/35

[56] References Cited

U.S. PATENT DOCUMENTS

| 946,989 | 1/1910 | Steinle | 82/36 A |
|---|---|---|---|
| 1,634,534 | 7/1927 | Brewer | 82/36 A |
| 3,710,466 | 1/1973 | Williamson et al. | 29/27 R |
| 3,725,987 | 4/1973 | Kurimoto et al. | 29/27 C |
| 3,726,162 | 4/1973 | Sato | 82/2 X |

FOREIGN PATENT DOCUMENTS

| 38-23211 | 11/1964 | Japan | 82/28 R |
|---|---|---|---|
| 39-33340 | 11/1964 | Japan | 82/28 R |

*Primary Examiner*—Leonidas Vlachos
*Attorney, Agent, or Firm*—Jay L. Chaskin

[57] ABSTRACT

A lathe on which the tool post is swiveled and indexed about a vertical axis and the workpiece is machined with a turning or rotary tool. The headstock is slidable upward and downward, and the work portions off the axis of the spindle can also be machined with the rotary tool. Once the workpiece is set in position, it can be subjected to a variety of machining operations on a number of surfaces.

6 Claims, 7 Drawing Figures

NUMERICALLY CONTROLLED LATHE

BACKGROUND OF THE INVENTION

This invention relates to a numerically controlled lathe capable of performing a variety of machining operations, such as turning, drilling, and milling, on many surfaces of a workpiece once held in position.

In the art of machine tools there has been proposed a lathe (Japanese Patent Laid-open No. 21785/72) which, in addition to the ordinary turning process, performs drilling, milling, and other machining operations of a workpiece chucked at the free end of the spindle by rotary and turning tools held on the tool post. However, because all the tools are directed to the axis of the spindle, the lathe is unable to face, drill or bore the work surfaces other than those oriented to the spindle axis.

In view of the above, the present invention contemplates the elimination of the foregoing disadvantage and provision of a numerically controlled lathe of a construction wherein the headstock is movable in the vertical direction and not merely the work portions aligned to the axis of the spindle but those off the axis can be machined as well.

BRIEF SUMMARY OF THE INVENTION

It is an object of this invention to provide a lathe of the type in which the tool post swivels for indexing with respect to the vertical axis and the workpiece is machined by turning or rotary tools, characterized in that the headstock is slidable upward and downward, permitting the machining of the work portions off the spindle axis by rotary tools, and enabling the workpiece once chucked in place to be machined in a variety of ways on a number of surfaces. This eliminates the need for resetting the workpiece on other machine tools for individual machining operations, thus reducing the overall machining time required.

Another object of the invention is to provide a lathe characterized in that the intermediate shaft portion in the mechanism for transmitting rotation to the input shaft of the headstock is gripped at two points, 90° apart, by springs so that the two-directional vibration produced in the transmission can be absorbed and the input shaft is protected against the adverse effect of vibration.

Yet another object of the invention is to provide a lathe characterized in that the output shaft for transmitting power to the carriage, such as the headstock, and the headstock input shaft are arranged in substantially right-angle relation through the medium of the intermediate shaft, whereby most of the vibration caused between the output shaft and intermediate shaft is kept from being transmitted to the input shaft, leaving the latter little affected by the vibration.

A further object of the invention is to provide a lathe characterized in that a tool stocker is mounted on top of the tool post so as to accommodate spare tools that must be replaced within relatively short periods of time, thereby reducing the time for tool replacement.

DETAILED DESCRIPTION OF THE INVENTION

Figure 1:
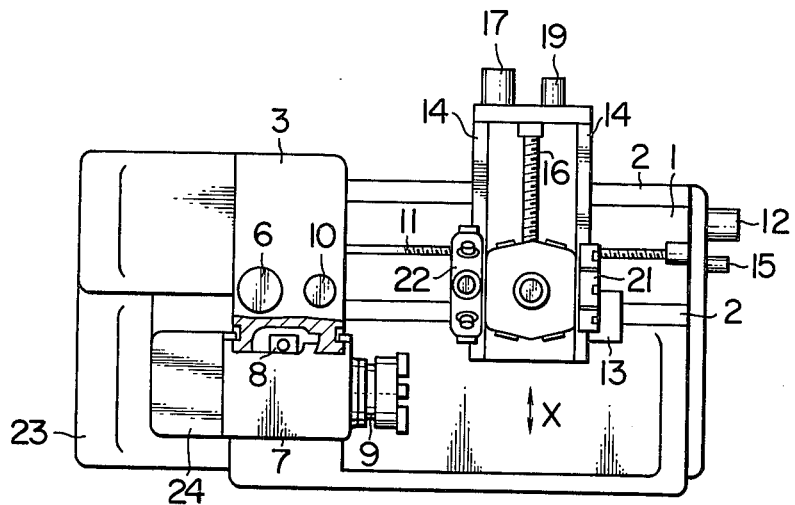
FIG. 1 is a general top view of a numerically controlled lathe embodying the invention.
Figure 2:
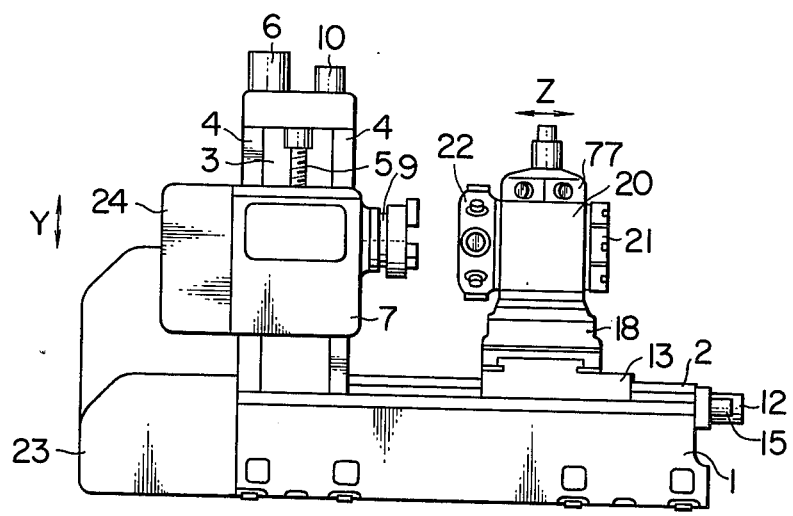
FIG. 2 is a general front view of the numerically controlled lathe of the invention.
Figure 3:
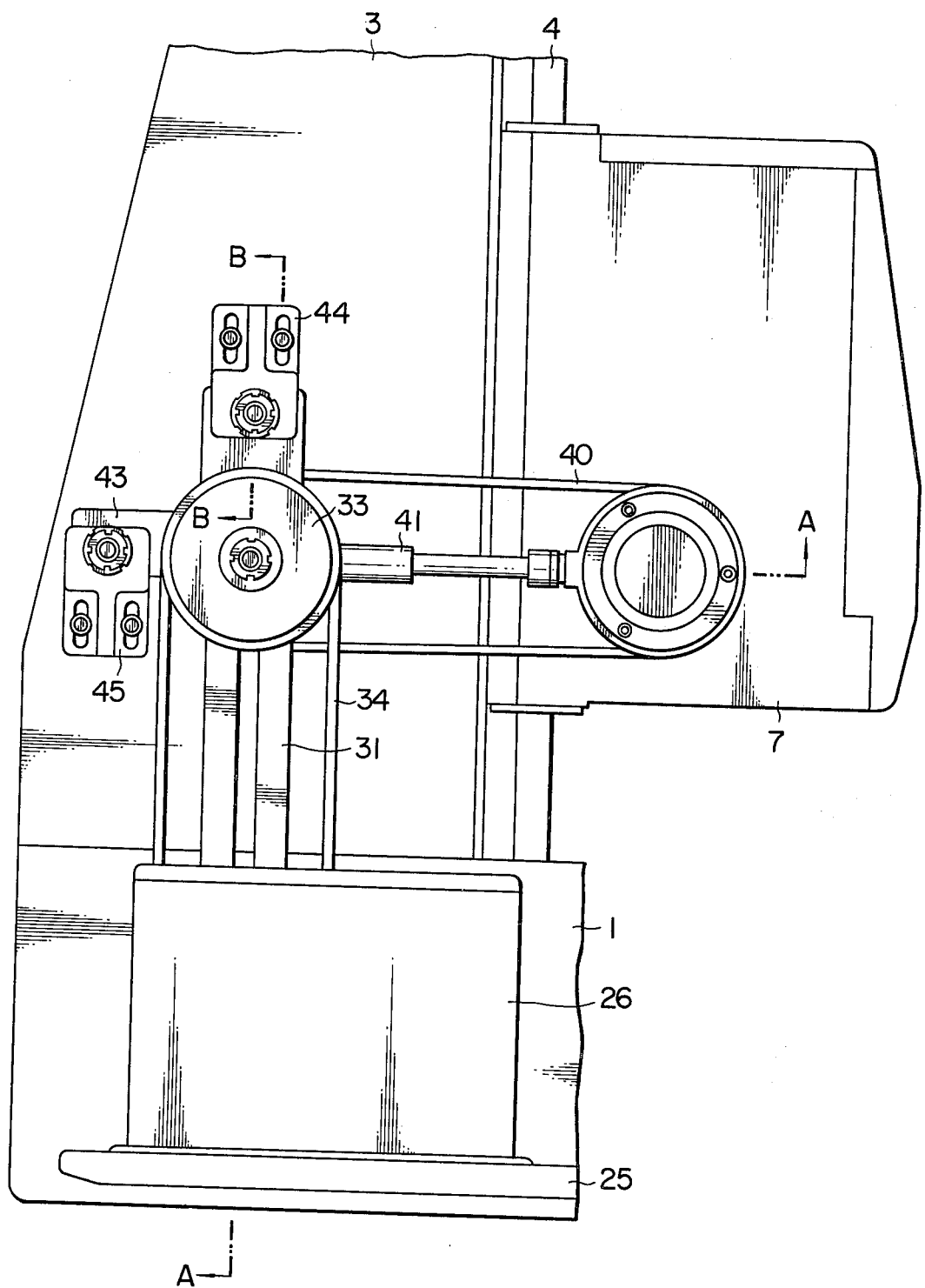
FIG. 3 is a view showing the shaft positions for transmitting rotation to the input shaft of the headstock.
Figure 5:
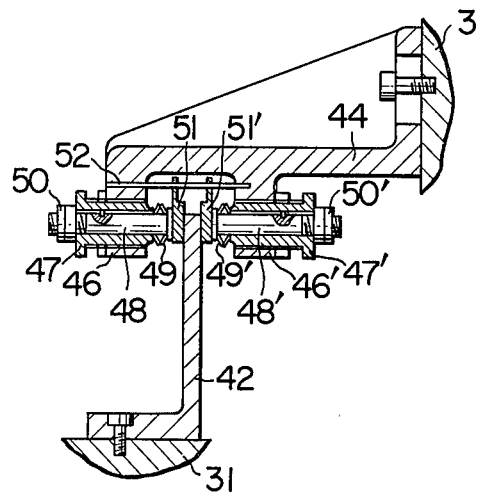
FIG. 5 is a sectional view taken along line B—B of FIG. 3.
Figure 4:
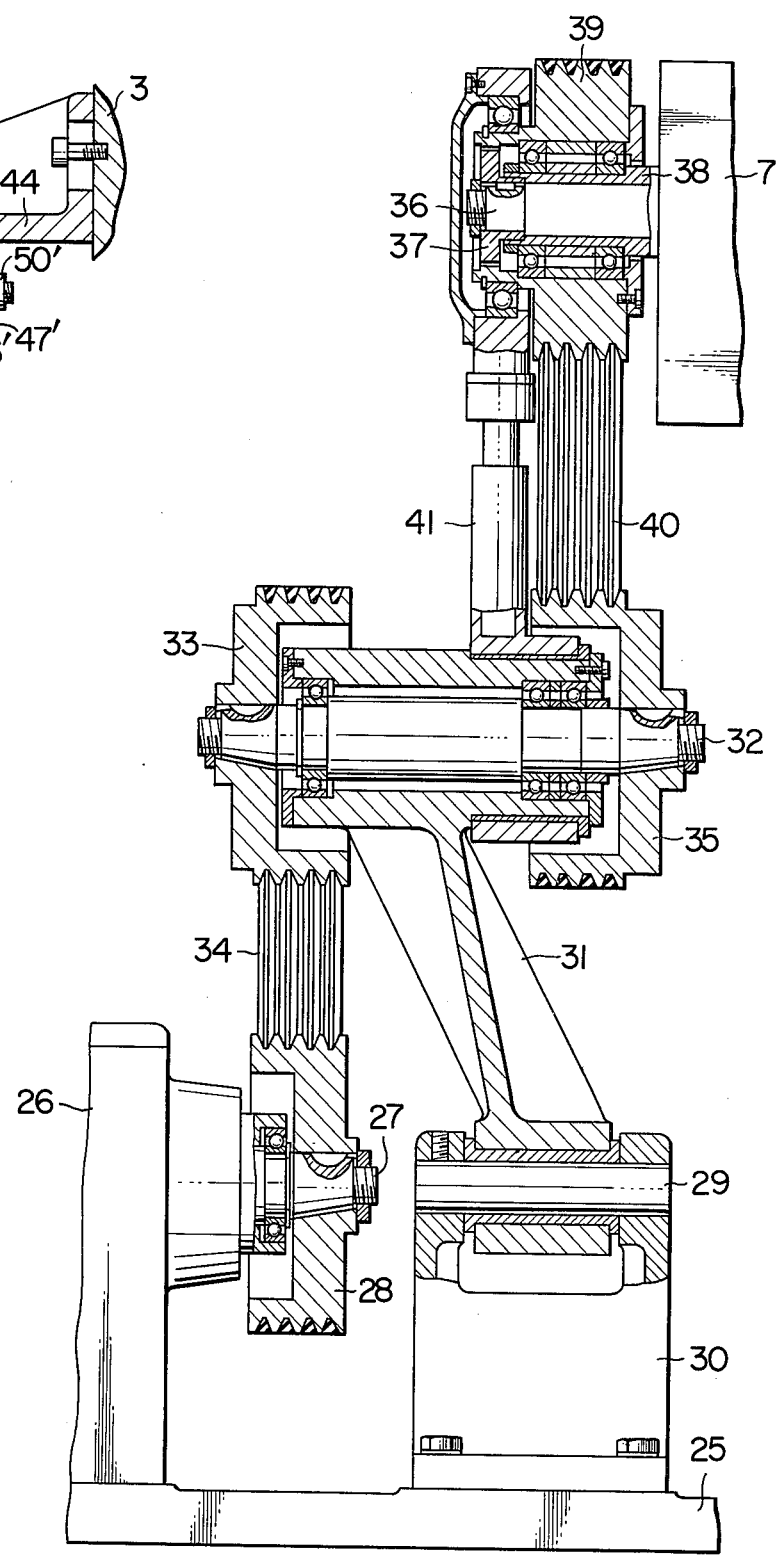
FIG. 4 is a partly sectional view taken along line A—A of FIG. 3.

In the exemplary embodiment of the invention as disclosed in the drawings, a bed 1 includes on its upper surface slideways 2 extended in the horizontal, longitudinal direction (Z axis), and a column 3 is held upright on one end of bed 1, with slideways 4 extended in the vertical direction (Y axis) at right angles to slideways 2. Inside the column and between and parallel to the slideways 4, there is provided a ground ball-nut feed screw 5 which is rotated by an electric motor 6 mounted on top of the column. A headstock 7, which includes a block 8 on its back side with an internally threaded hole receiving the feed screw, can be moved upward and downward along slideways 4 by motor 6 and be stopped and clamped at a desired point to the column. Inside the headstock 7 is journaled a spindle 9 with its axis parallel to slideways 2. The free end of the spindle carries a chuck for gripping a workpiece.

On top of the column is mounted a position sensor 10 connected to feed screw 5 for sensing the position of headstock 7 in the Y-axis direction.

A ground ball-nut lead screw 11 is extended through the bed, in parallel with slideways 2, and coupled for rotation to an electric motor 12 on the end of the bed opposite to the column. A carriage 13 has on its underside a block with an internally threaded hole (not shown) in engagement with the lead screw 11, and can be moved along slideways 2 in the Z-axis direction with the rotation of motor 12. On the upper surface of carriage 13, there extend slideways 14 on a horizontal plane in the (X-axis) direction across slideways 2. Side by side with motor 12, another position sensor 15 is connected to lead screw 11 to find the position of the carriage in the Z-axis direction. Inside the carriage and between and parallel to the slideways 14 is rotatably provided another ball-nut lead screw 16, which is driven by a motor 17 on the back side of the carriage. An intermediate table 18 includes a female screw not shown on its underside in engagement with lead screw 16 and moves crosswise or in the X-axis direction along slideways 4 as the screw is driven by motor 17. To the back side of the carriage is secured a position sensor 19, which is connected to lead screw 16 to sense the position in the X-axis direction of the intermediate table.

Numeral 20 indicates a tool post mounted on the intermediate table and is swiveled for indexing by a conventional drive. The tool post includes at least two vertical turret-mounting faces on its sides.

On top of the tool post is mounted a tool stocker 77 which accommodates as spares the tools that must be replaced, when required, within relatively short periods of time. To one of the vertical turret-mounting faces of tool post 20 is mounted a turret 21 holding a plurality of cutting tools and made turnable for indexing in respect to a horizontal axis. The plurality of tools are thus indexed in the usual manner so that each required tool can be presented to the workpiece by a rotating movement.

To the other vertical turret-mounting face of the tool post is attached a rotary-tool turret 22, which holds a plurality of rotary tools and is turnable for indexing to the horizontal axis. When desired, the plurality of rotary tools can be indexed so that the required one can be brought into an operating position by a known method, and only the particular tool facing the workpiece is caused to rotate.

Numeral 23 designates a cover attached to the left-hand ends of the bed and column, and 24 designates a cover for the same end of the spindle in the headstock. Inside these covers means for transmitting rotation to the input shaft of the headstock are accommodated.

Next, the means installed in the covers 23, 24 for transmitting rotation to the spindle of the moving headstock will be explained.

A base 25 is made fast to bed 1, and on this base are mounted a gear box 26 for changing the spindle speed and a main motor (not shown) for giving a rotational force to the spindle. An output shaft 27 is disposed in a position parallel to the spindle axis and is journaled in gear box 26. The shaft is rotated at varied speed when an input shaft (not shown) inside the gear box 26 is rotated by the main motor on base 25 and the rpm is changed in the gear box. A V belt pulley 28 is mounted integrally on the front end of output shaft 27. A short shaft 29 is journaled by a bracket 30 fast on base 25, with its axis aligned to a frontal extension line of output shaft 27.

One end of an arm 31 is pivotally supported by short shaft 29 with a bush, while the other end supports an intermediate shaft 32 through bearings rotatably in the direction parallel to the short shaft.

A V belt pulley 33 on the end of intermediate shaft 32 close to the gear box is connected to said V belt pulley 28 by a plurality of V belts 34. Another V belt pulley 35 is secured to the opposite end of the intermediate shaft.

Numeral 36 is an input shaft rotatably held by headstock 7, 37 is a spur gear integrally mounted on the rear end of input shaft 36, and 38 is a sleeve secured to headstock 7 in order to cover the outer periphery of the rear end of the headstock input shaft. Numeral 39 is a V belt pulley having an internal gear in mesh with gear 37 and attached to the outer periphery of sleeve 38 and rotatable with respect thereto. This V belt pulley 39 is connected to the V belt pulley 35 with V belts 40, in such a manner that only the rotational forces of the pulleys are transmitted to the input shaft of the headstock, keeping the latter from other influences, such as deflection with tension of the belts. A link member 41 for coupling the headstock input shaft 36 and intermediate shaft 32 is turnably pivoted at one end to the outer periphery of the arm portion 31 on the intermediate shaft 32 and at the other end to belt pulley 39, both through bearings, to follow the upward and downward motion of headstock 7.

A pair of plate-like lugs 42, 43 are secured, 90 deg. apart, to the portion of arm 31 on the intermediate shaft.

Also, a pair of brackets 44, 45, adjustable in position, are attached to one side of column 3. The free end of bracket 44 is provided with two lugs 46, 46', both of which have internally threaded holes. Externally threaded sleeves 47, 47' are, respectively, engaged with the internally threaded holes of lugs 46, 46', opposite to each other. Flanged pins 48, 48' are fitted in the externally threaded sleeves with the flanged ends inward. The two pins 48, 48' are biased toward each other by Belleville springs 49, 49' interposed between the flanges and sleeves. The lengths of exposed portions of pins 48, 48' are adjusted with adjust nuts 50, 50' on the threaded ends of the pins. A pair of shoes 51, 51' are connected to bracket 44 through a pin 52, moveable in the Z-axis direction. They are constructed to be urged by springs 49, 49', respectively, to grip lug 42 in cooperation with the flanges at the inner ends of pins 48, 48'.

Similarly, lug 43 is gripped by a pair of shoes of the same construction as above described. The lengths of arm 31 and link 41 are chosen to provide relative positioning such that, when headstock 7 is midway its sliding stroke, the straight line connecting the centers of output shaft 27 and intermediate shaft 32 is substantially at a right angle to the straight line connecting the centers of intermediate shaft 32 and headstock input shaft 36.

Figure 6:
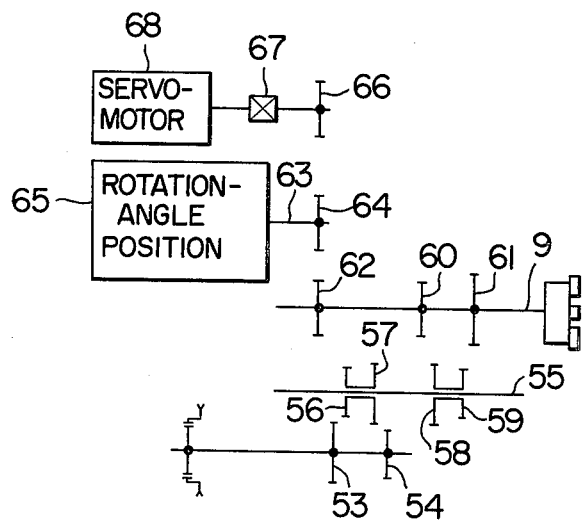
FIG. 6 is a diagram illustrating the relationship of gear connections in the headstock.

The driving system for the spindle in the headstock will now be described with reference to FIG. 6. Numerals 53, 54 denote spur gears secured to headstock input shaft 36, and 55 a spline shaft journaled in parallel with the spindle in the headstock. Spur gears 56, 57 are adapted to slide together on spline shaft 55 into engagement with either spur gear 53 or 54. Another pair of spur gears 58, 59 slide together on spline shaft 55. A set of spur gears 60, 61 mounted on spindle 9 is adapted to mesh with either of spur gears 58, 59 when the latter both slide.

Such pairs of slidable spur gears 56, 57 and 58, 59 have neutral positions to which they slide and remain out of mesh with each other.

Numeral 62 is an additional spur gear mounted on spindle 9, 63 is a short shaft journalled in the headstock in parallel with the spindle 9, 64 is a spur gear always in mesh with spur gear 62 and secured to short shaft 63, and 65 is a rotation-angle position sensor attached to one end of the short shaft 63. The sensor 65 is kept revolving as long as the spindle runs to sense the angular position of rotation of the spindle. Always in mesh with spur gear 64 is another spur gear 66, which is connected through a clutch 67 to a servomotor 68. Control of the rotation angle of the spindle (C-axis control) is accomplished by this servomotor 68 and rotation-angle position sensor 65.

Figure 7:
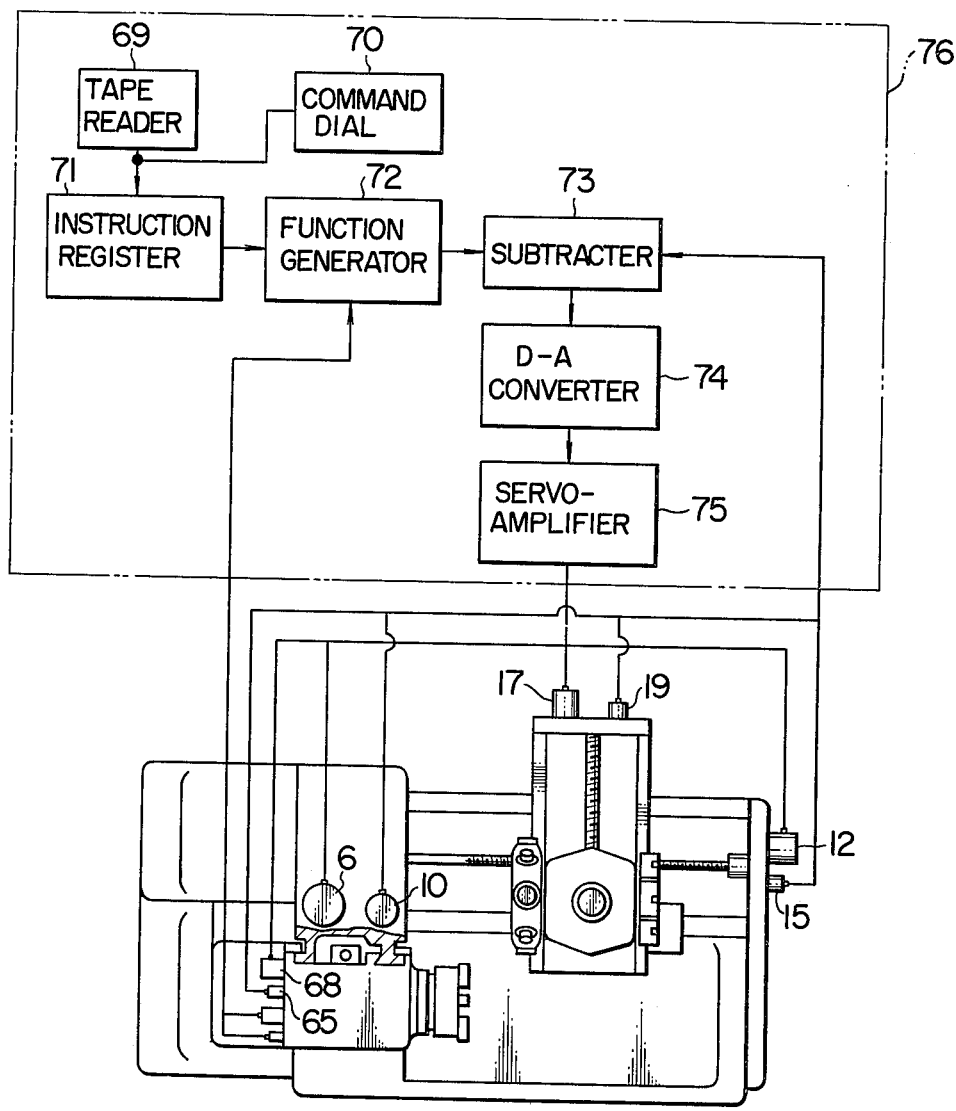
FIG. 7 is a block diagram of a control system for the lathe embodying the invention.

FIG. 7 is a block diagram of a control system for controlling the lathe by a numerical control unit 76. Instructions from a tape reader 69 or command dial 70 are memorized by an instruction register 71. A function generator 72 receives from the register the X- and Z-axis commands for the tool post, the Y-axis commands for the headstock, and the C-axis commands for the spindle, and successively sends out to a subtracter 73 the commands in the form of instantaneous outputs in the paths of movement of the tool post and headstock and in the path of rotation of the spindle until the commands are executed. Upon receipt of signals from the X-axis position sensor 19 and Z-axis position sensor 15 of the tool post, Y-axis position sensor 10 of the headstock, and C-axis rotation-angle position sensor 65 of the spindle, subtracter 73, then, compares the values with the output from function generator 72 and transmits the difference to a D-A converter 74. The converter changes the digital input signals to proportional analog signals with which to control, through a servoamplifier 75, the X-axis motor 17 and Z-axis motor 12 of the tool post, Y-axis motor 6 of the headstock, and C-axis motor 68 of the spindle. When motor 68 is driven, the clutch 67 is at work.

The tool post, headstock, and spindle being thus driven, the outputs from their respective position sensors will vary.

Since function generator 72 gives instantaneous outputs in succession as its commands, subtracter 73 compares the outputs with those of the position sensors of the drives that indicate the present positions. The drives continue to run until the differences are reduced to zero, at which point they come to a stop.

Upon arrival at each goal position the headstock is clamped to the column under the command of the numerical control unit.

The lathe of the construction above described is operated in response to commands from the numerical control unit in the manner now to be described.

Turning operation is started by having a work gripped by the chuck at the free end of the spindle, moving the headstock vertically until the spindle axis is aligned to the horizontal swivel axis of the turret on a horizontal plane, and then clamping the headstock to the column. The tool post is swiveled for indexing so that the turning turret is held opposite to the workpiece. Next, the turret itself is indexed to bring the required turning tool to the machining position relative to the workpiece, and then the tool post is moved in the X- and Y-axis directions for proper turning operation. Meanwhile, clutch 65 inside the headstock is disengaged and the pairs of gears 56, 57 and 58, 59 are meshed with matching gears, the spindle being driven at a desired speed.

Where any off-center surface of the workpiece is to be machined, for example, by milling or drilling, the workpiece is chucked, the headstock is moved vertically so that the work portion to be machined is aligned to the horizontal swiveling axis of the turret on a horizontal plane, and then the headstock is clamped to the column. At this time, the intermediate shaft portion will be swung about short shaft 29 by means of arm 31 and link member 41, causing lugs 42, 43 to swing too. The lugs are swingable because they are held only by springs 49, 49′ in the direction of spindle axis. They are thus swung and displaced but their vibration-absorbing capacity will remain unaffected. Following this, the tool post in swiveled for indexing until the rotary-tool turret is brought opposite to the workpiece. The turret is indexed so that the necessary one of the rotary tools is set to the machining position. The tool post is moved in the X- and Z-axis directions and the tool is rotated for the machining operation. Inside the headstock either pair of gears 56, 57 or 58, 59 is set to neutral position, the clutch 65 is engaged, and the machining is carried out by either turning the spindle to a desired angle by motor 68 or keeping the spindle stationarily.

What is claimed is:

1. An improved numerically controlled lathe of the type having a bed, a column mounted on said bed, a headstock mounted to said column for vertical slidable movement thereon, a spindle extending from said headstock being provided with a workholding chuck, a tool post movable in a parallel and a transverse direction with respect to said spindle and pivotable on a vertical axis, said tool post being provided with opposed vertical side faces having tool turrets turnable for indexing to a horizontal axis, said tool turrets on one of said opposed vertical faces adapted to hold rotary tools and said tool turret on the other of said vertical faces adapted to hold turning tools, a numerical control unit for controlling movement of said headstock, said tool post and said tool holders and a drive means having a vertically fixed output shaft, wherein the improvement comprises:

(a) an input shaft journalled in said headstock;
(b) means within said headstock for selectively transferring rotational motion of said input shaft to rotational motion of said spindle; and
(c) rotational motion transfer means constructed and arranged to transfer rotational motion of said output shaft to rotational motion of said input shaft for all vertical positions of said headstock on said column, said means including:
  (i) a support means secured to said bed;
  (ii) an arm having two ends, said arm pivotably mounted at one end to said support means;
  (iii) an intermediate shaft journalled in said arm at said other of two ends;
  (iv) a link member pivotably secured to said input shaft and pivotably secured to said arm at said other of two ends;
  (v) a first drive belt assembly operably coupling said output shaft to said intermediate shaft; and
  (vi) a second drive belt assembly operably coupling said intermediate shaft to said input shaft;
  (vii) said arm pivoting about said one end coaxially of said output shaft on said support means and said link member pivoting about said other of two ends as said headstock is displaced vertically on said column to maintain each of said drive belt assemblies in an operable condition.

2. The improved numerically controlled lathe in accordance with claim 1 wherein said output shaft and said intermediate shaft lie in a vertical plane and said intermediate shaft and said input shaft lie in a plane perpendicular to said vertical plane when said headstock is at the midpoint of its range of slidable movement on said column.

3. The improved numerically controlled lathe in accordance with claim 1 further including a vibration absorption means constructed and arranged to support said intermediate shaft thereby preventing transmission of vibration to said input shaft through said kinematic coupling means.

4. The improved numerically controlled lathe in accordance with claim 3 wherein said vibration absorption means comprises:

(a) a first plate-like lug secured to said other of two ends of said arm;
(b) a second plate-like lug secured to said other of two ends of said arm displaced thereon 90° from said first plate-like lug; and
(c) a gripping assembly associated with each of said first and said second plate-like lugs to restrict movement thereof, said gripping assembly including:
  (i) a bracket mounted on said column;
  (ii) a pair of spaced lugs extending from said bracket, each of said pair of lugs having an internally threaded hole, said holes being oppositely disposed on said lugs;
  (iii) an externally threaded sleeve received within each of said internally threaded holes;
  (iv) a spring loaded pin received within each of said sleeves, said pins biased towards each other; and
  (v) a pair of shoes slidably mounted in said bracket between said spring loaded pins, said respective plate-like lug being received between said pair of shoes;

(vi) said spring loaded pins acting through said shoes on said plate-like lug to restrict movement of said plate-like lug.

5. The improved numerically controlled lathe in accordance with claim 1 wherein said arm pivots on said support means on an axis aligned with the longitudinal axis of said output shaft.

6. The improved numerically controlled lathe in accordance with claim 1 further including a tool stocker disposed on the top of said tool post.

* * * * *